(12) United States Patent
Lange et al.

(10) Patent No.: US 6,798,523 B2
(45) Date of Patent: Sep. 28, 2004

(54) SENSOR AND METHOD FOR DETECTING FIBER OPTIC FAULTS

(75) Inventors: Charles Lange, Glendale, AZ (US); Scott Anson, Glendale, AZ (US); Dick Ang, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 179 days.

(21) Appl. No.: 10/004,651

(22) Filed: Dec. 4, 2001

(65) Prior Publication Data

US 2003/0103211 A1 Jun. 5, 2003

(51) Int. Cl.[7] ................................................. G01B 9/02
(52) U.S. Cl. ....................................... 356/482; 356/483
(58) Field of Search ............................... 356/477, 479, 356/482, 483, 227.19, 227.27, 12

(56) References Cited

U.S. PATENT DOCUMENTS

| | | | |
|---|---|---|---|
| 4,572,949 A | * | 2/1986 | Bowers et al. .............. 356/482 |
| 5,701,006 A | | 12/1997 | Schaefer |
| 5,734,469 A | | 3/1998 | Strandjord |
| 6,175,410 B1 | | 1/2001 | Szafraniec et al. |
| 6,211,963 B1 | | 4/2001 | Kaliszek et al. |

FOREIGN PATENT DOCUMENTS

| | | |
|---|---|---|
| DE | 4018379 | 12/1991 |
| EP | 0450782 | 10/1991 |
| EP | 0556041 | 8/1993 |
| EP | 0556960 | 8/1993 |
| GB | 2152657 | 8/1985 |
| GB | 2284256 | 5/1995 |
| WO | WO 9942787 | 8/1999 |

* cited by examiner

*Primary Examiner*—Samuel A. Turner

(57) ABSTRACT

A fiber optic fault detector and generic fiber optic sensor system for detecting breaks in an optical fiber using a low coherence interferometric technique. The system comprises a light source configured to produce light traveling along the optical path, a modulator optically coupled to the light source configured to modulate at least a portion of the light as a function of a modulation signal, a detector optically coupled to the modulator configured to produce a detector output based upon a sensed intensity of the light, and an electronic array configured to receive the detector output and determine the optical fault. The low coherence interferometric technique allows for detection of a fault in the fiber with a minimal amount of test equipment and with higher measurement sensitivity and resolution. The system may alternatively include a transducer, positioned in place of the fiber under test, having a response which changes in reflective or optical path length. The system can be used in a LIDAR system, wherein telescope optics are used in place of the fiber under test, to transmit light and collect light scattered from objects or from the air.

23 Claims, 7 Drawing Sheets

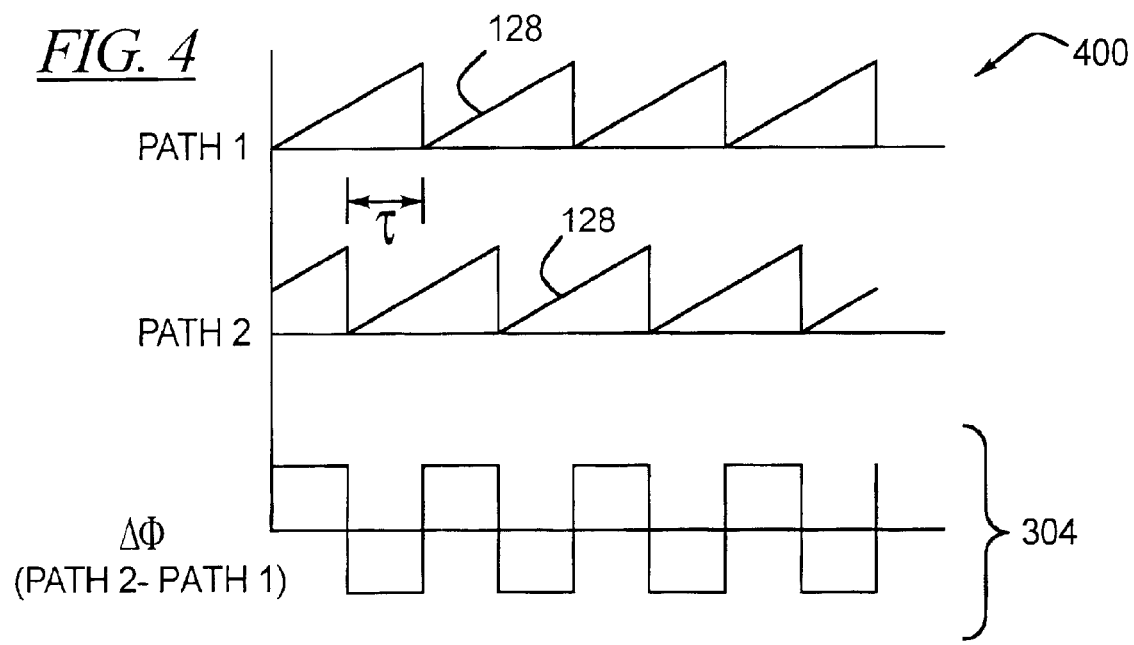
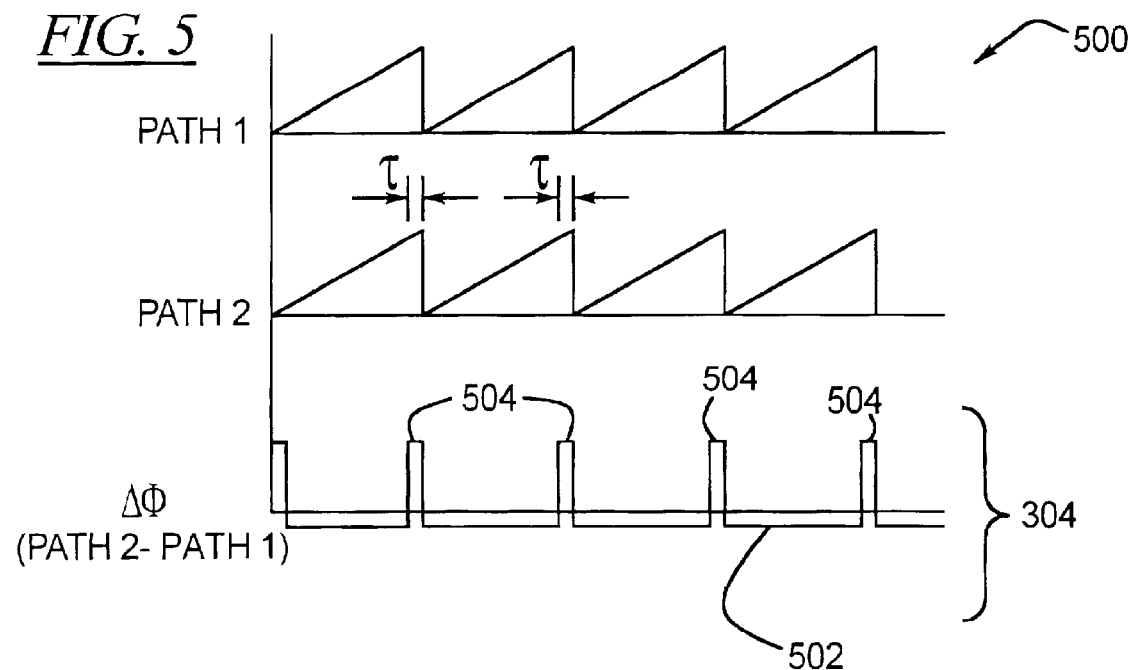

SENSOR AND METHOD FOR DETECTING FIBER OPTIC FAULTS

TECHNICAL FIELD OF THE INVENTION

The invention relates generally to optical sensors. More particularly, the invention relates to interferometric sensors for determining optical path length.

BACKGROUND OF THE INVENTION

As fiber optics become more prevalent, various types of optical sensors have become increasingly common. Indeed, various types of sensors can be used to detect fiber lengths, locations of breaks, cracks or inconsistencies in optical fibers, temperature, pressure, fiber expansion, attributes of chemical species, etc.

Optical fibers may be subjected to various external effects that produce geometric (e.g., size, shape) and/or optic (e.g., refractive index, mode conversion) changes to the fiber depending upon the nature and the magnitude of the perturbation. While these effects are often considered to be parasitic (i.e. noise-causing) in communications applications, the response of the fiber to external influence may be increased in sensing applications so that the resulting change in optical characteristics can be used as a measure of the external effect. Therefore, optical fibers may act as transducers that convert effects such as temperature, stress, strain, rotation or electric and magnetic currents into corresponding changes in optical effects.

Since amplitude or intensity, phase, frequency, and polarization typically characterize light, any one or more of these parameters may undergo a change due to external effects. The usefulness of the fiber optic sensor therefore depends upon the magnitude of this change and upon the ability to measure and quantify the change reliably and accurately.

Different types of sensors based upon fiber optic technologies are known. Among such sensor technologies are interferometers, which typically detect various phenomena by sensing phase changes or interference patterns between multiple optical signals passing through the sensor. In fact, interferometers can be used to determine distance, slope, rotation, and the like. Specifically, since about 1980, interferometric fiber optic gyroscopes (IFOGs) have been widely used to detect rotation, because such sensors have proven to be particularly useful for generating inertial navigation data that can be used to guide aircraft, automobiles, downhole drilling apparatus, and robots. Various embodiments of IFOGs are generally described in U.S. Pat. Nos. 6,211,963 and 6,175,410, which are incorporated herein by reference. In addition, techniques for sensing proper frequency used in conjunction with IFOGs are generally described in U.S. Pat. No. 5,734,469, which is incorporated herein by reference.

In practice however, interferometers are often complex and difficult to design and manufacture, and interferometers are typically not suitable for low-cost applications such as fiber optic length sensors. Thus, the present invention solves this problem by presenting a relatively simple and low-cost interferometric sensor that is accurate, has a high resolution, is useful for a variety of applications.

SUMMARY OF THE INVENTION

In accordance with one aspect of the invention, a sensor for determining a length of an optical path, comprises a light source, a modulator configured to direct light along said optical path, and an electronic system. The modulator is optically coupled to the light source, and the modulator is configured to modulate at least a portion of the light as a function of a modulation signal. The detector is optically coupled to the modulator and is configured to produce a detector output based upon a sensed intensity of the light at the end of the optical path. The electronic system is configured to receive the detector output, whereby the optical path length is determined by the detector output.

In accordance with another aspect of the invention, a method of determining a length of an optical path comprises the following: generating a light along the optical path; splitting the light into a first beam and a second beam; modulating at least one of the first beam and the second beam in response to a modulation signal to induce a difference between the first beam and the second beam; re-combining the first beam and the second beam to generate a recombined signal; detecting an output intensity of the recombined signal at a detector; adjusting the modulation signal as a function of the output intensity; and computing the length of the optical path as a function of the modulation signal.

In accordance with a further aspect of the invention, a system for determining the length of an optical fiber under test comprises a low coherence white light source configured to send light along an optical path defined by an optical fiber, a phase modulator optically coupled to the light source for modulating at least a portion of the light in a first path relative to a second path, a detector optically coupled to the optical path for producing a detector output based upon a length of the optical path, and a processor for receiving the detector output and for producing an output based upon the length of the optical path, wherein the light source has a coherence length shorter than a difference in path length between the first and the second paths.

BRIEF DESCRIPTION OF THE DRAWING

These and other features and advantages will become more apparent from a detailed consideration of the invention when taken in conjunction with the drawings in which:

FIG. 4 is a plot of various exemplary modulation signals at a proper frequency according to the present invention;

FIG. 5 is a plot of various exemplary modulation signals that are not at a proper frequency.

DETAILED DESCRIPTION

The present invention may be described herein in terms of functional block components and various processing steps. It should be appreciated that such functional blocks may be realized by any number of hardware and/or software components configured to perform the specified functions. For example, the present invention may employ various integrated circuit or optical components, e.g., memory elements, processing elements, logic elements, look-up tables, and the like, which may carry out a variety of functions under the control of one or more microprocessors or other control devices. Similarly, the software elements of the present invention may be implemented with any programming or scripting language, such as C, C++, Java, or Assembly, with various algorithms being implemented with any combination of data structures, objects, processes, routines or other programming elements.

Further, it should be noted that the present invention could employ any number of conventional techniques for electronics configuration, optical configuration, signal processing, and data processing.

It should be appreciated that the particular implementations shown and described herein are examples of the invention and are not intended to otherwise limit the scope of the present invention in any way. For the sake of brevity, conventional electronics, optics, software development and other functional aspects of the present invention, and components of the individual operating systems of the invention, may not be described in detail herein.

Moreover, no item or component is essential to the practice of the present invention unless the present apparatus and method claim elements are specifically described herein as essential or critical.

According to various exemplary embodiments of the present invention, a fiber optic sensor and its associated method of operation, is produced that provides a highly reciprocal light path for two or more light beams in an interferometer. Indeed, the paths taken by the various beams propagating through the optical portion of the sensor may be identical, except for a portion of the optical circuit that induces a modulation between the beams. In various embodiments, a modulation technique based upon the proper frequency may be sensitive to minute changes in the length of the optical path taken by the light in the interferometer. Such sensor may be useful in a variety of applications including, a fiber break tester, a LIDAR system, an optical transducer circuit, or in any number of pressure, temperature or chemical sensing applications.

In addition, various conventional techniques such as manufacturing techniques, modulation techniques and signal processing techniques, used in conjunction with interferometric sensors (such as IFOGs), may be used in conjunction with the present invention. Moreover, bulk optics components such as couplers and the like, may be substituted for any of the components described herein.

Figure 1:
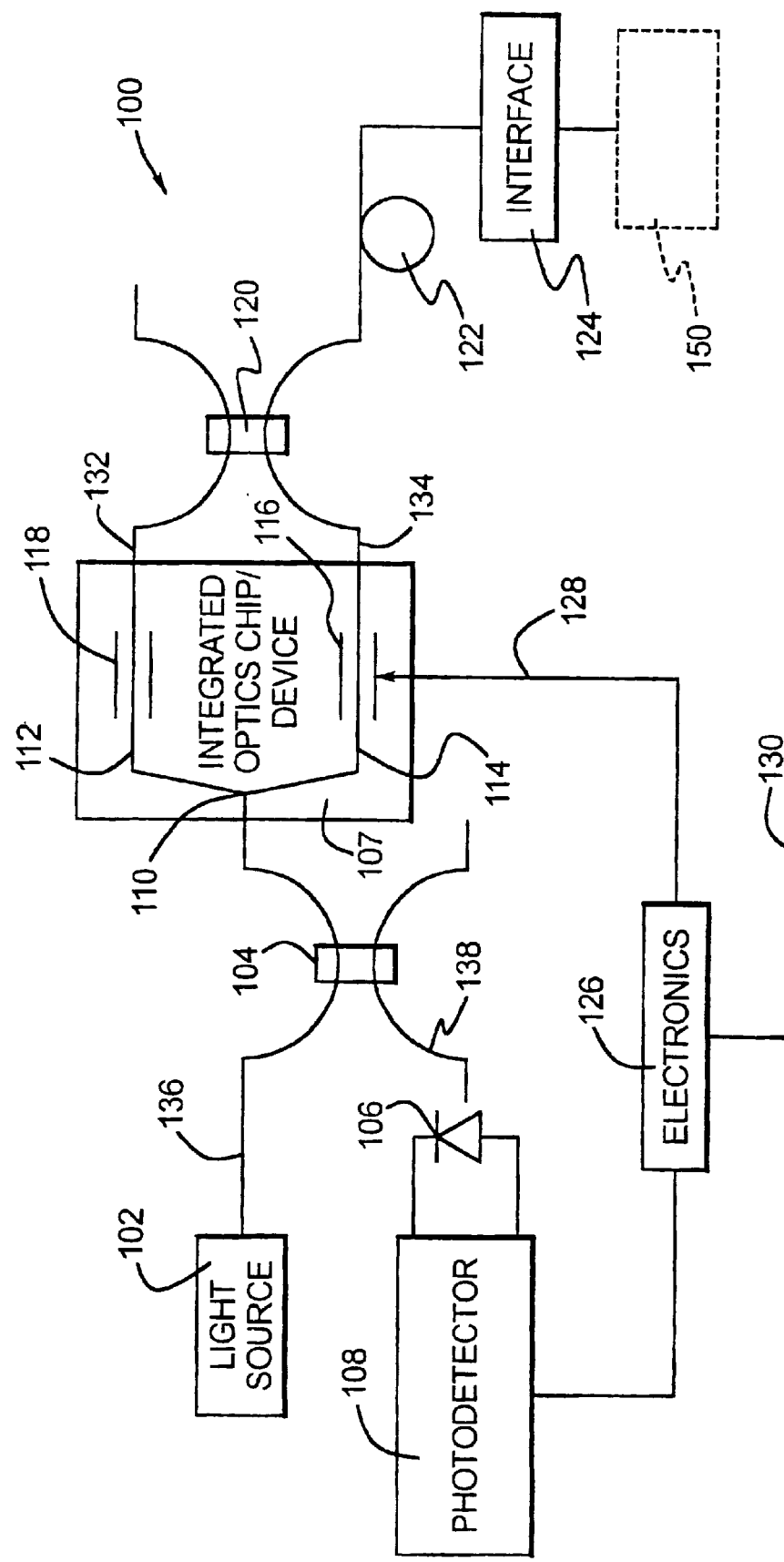
FIG. 1 is a block diagram of an exemplary sensor according to the present invention.

FIG. 1 is a schematic of a first exemplary embodiment of an interferometric sensor.

With reference to FIG. 1, an exemplary sensor system 100 includes a light source 102, a first optical coupler 104, a photodetector circuit 108 that may be coupled to a photodiode 106, an integrated optics chip (IOC) 107, a second optical coupler 120, an optional delay loop 122, an interface 124 and a suitable electronic system 126 providing a sensor output 130. Light generated by light source 102 suitably passes through sensor 100 to a device 150, such as an optical fiber under test, a telescopic lens, or any other device coupled to interface 124.

Integrated optics chip (IOC) 107 may include a Y-junction 110 and one or more phase modulators 116, 118, as shown in FIG. 1. In such embodiments, Y-junction 110 separates light into two components traveling on paths 112 and 114, respectively that may be individually modulated to induce phase differences between the two beams. The separated beams may be re-combined at coupler 120 so that the only non-reciprocal portion of sensor 100 is that portion between Y-junction 110 and coupler 120.

After light is provided to the sensing device coupled to interface 124, reflected light from the device may be returned through the optical portion of sensor 100 to detector 106, which produces a signal indicative of the phase difference between the separate beams as appropriate. This phase difference may be observed and processed by electronic system 130 to determine the total path length of the light traveling through the device. This phase difference may also be used to compute a modulation signal 128, as described more fully below.

Light source 102 is any device capable of producing light in sensor 100 such as a laser diode (LD), a light-emitting-diode (LED), a super-luminescent diode (SLD), or the like.

Although coherent light or light having any coherence length could be used, various types of light source 102 produce white light with a relatively low coherence length, which is typically on the order of several hundred microns or less, to create desired interference patterns at detector 106, as described more fully below. Light generated by light source 102 is split into at least four components in sensor 100 corresponding to: (1) path 112 out, path 112 returning; (2) path 112 out, path 114 returning; (3) path 114 out, path 112 returning; and (4) path 114 out, path 114 returning.

If the coherence of light source 102 is properly selected such that the coherence length of light source 102 is significantly shorter than the differential path length between paths 112 and 114, then only the interference of paths (2) and (3) above will produce a desired signal at photodetector 108. The specific bandwidth of light source 102 is relative to the particular application, but in various exemplary embodiments light source 102 is a fiber light source, laser diode (LD), or super-luminescent diode (SLD). Light source 102 is coupled to optical f5 fiber 136 through any conventional technique.

Optical fibers 132, 134, 136, 138 interconnecting the various components in sensor 100 may be any sort of optical fiber capable of directing light between the components.

In another embodiment, the optical fibers are single mode fibers capable of directing a single optical mode, such that various filters are not required in sensor 100 to isolate desired modes for signal processing. Optical fibers may also be polarization maintaining fibers or polarizing fibers, particularly in embodiments that do not include a polarizer in the optical circuit such as the embodiment shown in FIG. 1. If polarization maintaining optical fiber is not used, various alternate embodiments might include an optical polarizer anywhere in the optical circuit such as IOC 107 or between coupler 104 and IOC 107.

Couplers 104, 120 may be any coupling devices capable of joining optical signals propagating on separate fibers. Exemplary couplers include conventional 2×2 couplers, such as ones available from the Sifam Instruments, Ltd. of Devon, England. Alternatively, fibers 136, 138 and 132, 134 may be joined to form a coupler by stripping the cladding off of each fiber in the relevant position for the coupler, placing the two fiber cores together, and melting the cores together with the application of heat and/or tensile pressure. Light entering couplers 104, 120 from either port in a first direction are divided into two portions, with each portion exciting the coupler on a port on the opposite side of the coupler. In another embodiment, the light is split approximately equally between the two opposing ports. In yet other embodiments, one of the ports receives more or even all of the light passing through the coupler.

The IOC 107 includes a Y-junction and at least one modulator 116, 118. In another embodiment, IOC 107 is formed from lithium niobate (LiNO$_3$) or another material that affects the speed of light in response to an applied electric potential. Alternatively, IOC 107 may be any conventional optical splitter/modulator combination, such as a model #SG-150-11=k IOC available from JDS Uniphase Corporation of San Jose, Calif. IOC 107 suitably includes a waveguide, shown as a solid line in FIG. 1, for guiding light from source 102 through the chip. The path may include a Y-junction 110 that splits light from coupler 104 into two paths 112 and 114. The Y-junction 110 may also re-combine light received upon paths 112 and 114, as appropriate.

One or more optical phase modulators 116, 118, which may be implemented as electrodes in IOC 107 near paths 114, 112, may be provided to produce phase shifts in light passing through paths 114, 112, respectively, in response to modulation signals produced by electronic system 130. In various alternate embodiments and as described more fully below, IOC 107 may be replaced with different but equivalent components such as couplers, splitters, modulators, such as piezoelectric modulators, etc.

Optional delay loop 122 may be included in various embodiments. Delay loop 122 may be a physical loop or coil of optical fiber that adds to the optical path length traveled by light in sensor 100.

Interface 124 is any interface to a device 150 being sensed. For example, device 150 can be a lens arrangement, such as a telescopic lens, used with a LIDAR system, or interface 124 could be an interface to an external optical fiber under test to detect a fault, or as a fiber length measurement sensor. Interface 124 may be a mere fiber splice, or interface 124 can be omitted in embodiments where sensor 100 is formed as an integral part of an optical fiber.

Photodetector 108 may be any circuit capable of detecting the amplitude or intensity of light emanating from fiber 138. In various embodiments, photodetector circuit 108 suitably includes a photodiode or avalanche photodiode 106 that conducts an electric current in response to the intensity of incident light. Photodetector circuit 108 may also include circuitry or other components to generate a digital or analog signal provided to electronic system 130, as appropriate. Numerous conventional photodetector circuits 108 have been developed for use with fiber optic gyroscopes or other sensors that may be applicable to sensor 100. In another embodiments, photodetector 108 is a model PN 03000040-999 photodiode available from the Epitaxx Corporation of West Nepian, Ontario, Canada.

Photodetector 108 response may be dependent upon the wavelength of incident light, so photodetector 108 may be selected to correspond to the wavelength of light propagating through sensor 100.

Electronic system 126 includes processing circuitry suitable for calculating sensor output 130 and feedback signal 128, can be a microprocessor, a microcontroller, a digital signal processor, a programmed array logic (PAL), an application specific integrated circuit (ASIC), or other such device. Electronic system 126 suitably includes a digital signal processor, which will typically be provided in conjunction with an associated memory and circuitry for addressing, input/output.

Electronic system 126 integrates, filters and processes the output of photodetector 108 to produce an output signal 130.

It should be appreciated that even though FIG. 1 shows sensor 100 operating as a feedback driven or "closed loop" sensor, alternate embodiments may use an "open loop" (i.e., no feedback) configuration that generates modulation signal 128 without regard to the output of photodetector 108. However, while closed loop operating may add to the stability and resolution of sensor 100, closed loop operating may be more complex than open loop operation in many embodiments. Thus, various embodiments of electronic system 126 could be readily adapted for use with the present invention.

The sensor system 100 of the present invention functions by passing light generated from light source 102 through coupler 104 to IOC 107. The light is split by Y-junction 110 into a beam passing through waveguide 112 and a beam passing through waveguide 114. At least one of the beams is modulated by phase modulator 116 in response to modulation signal 128, as described more fully below, to create a shift in the phase of the light beam. The two beams are re-combined at coupler 120, where light is passed through optional delay loop 122 to interface 124 and onto the sensed device 150. Light reflected from the sensed device reenters sensor 100 at interface 124, where the light passes through optional delay loop 122 before being split at coupler 120. The reflected light is split into a component passing on fiber 132 and waveguide 112, and a component passing on fiber 134 and waveguide 114, where a modulation may be applied by modulator 116. The two components are suitably rejoined at Y-junction 110 and passed through coupler 104 to detector 108.

As noted above, light generated by light source 102 is split into at least four components corresponding to: (1) path 112 out, path 112 returning; (2) path 112 out, path 114 returning; (3) path 114 out, path 112 returning; and (4) path 114 out, path 114 returning. It should be noted that the two components of light passing through path (2) and light passing through path (3) will traverse identical distances. Moreover, light passing on these paths will receive identical modulations from modulator 116, although the modulation will be shifted in time by an amount related to the time delay for the beam to pass through the sensed device. Hence, the difference in modulations applied to the two beams is due to the time delay, which is related to the length of the device. By adjusting the modulation applied to account for this delay, the length of the path traversed by the beams can be calculated. This path length can be used to determine the length of an optical fiber or the location of a break in an optical fiber. Alternatively, the path length could be used in any other type of sensor such as a LIDAR system, or transducer sensor.

The basic concepts described above and below may be applied to any number of equivalent devices that produce a sensor output 130 based upon a sensed interference of two light signals.

Figure 2A:
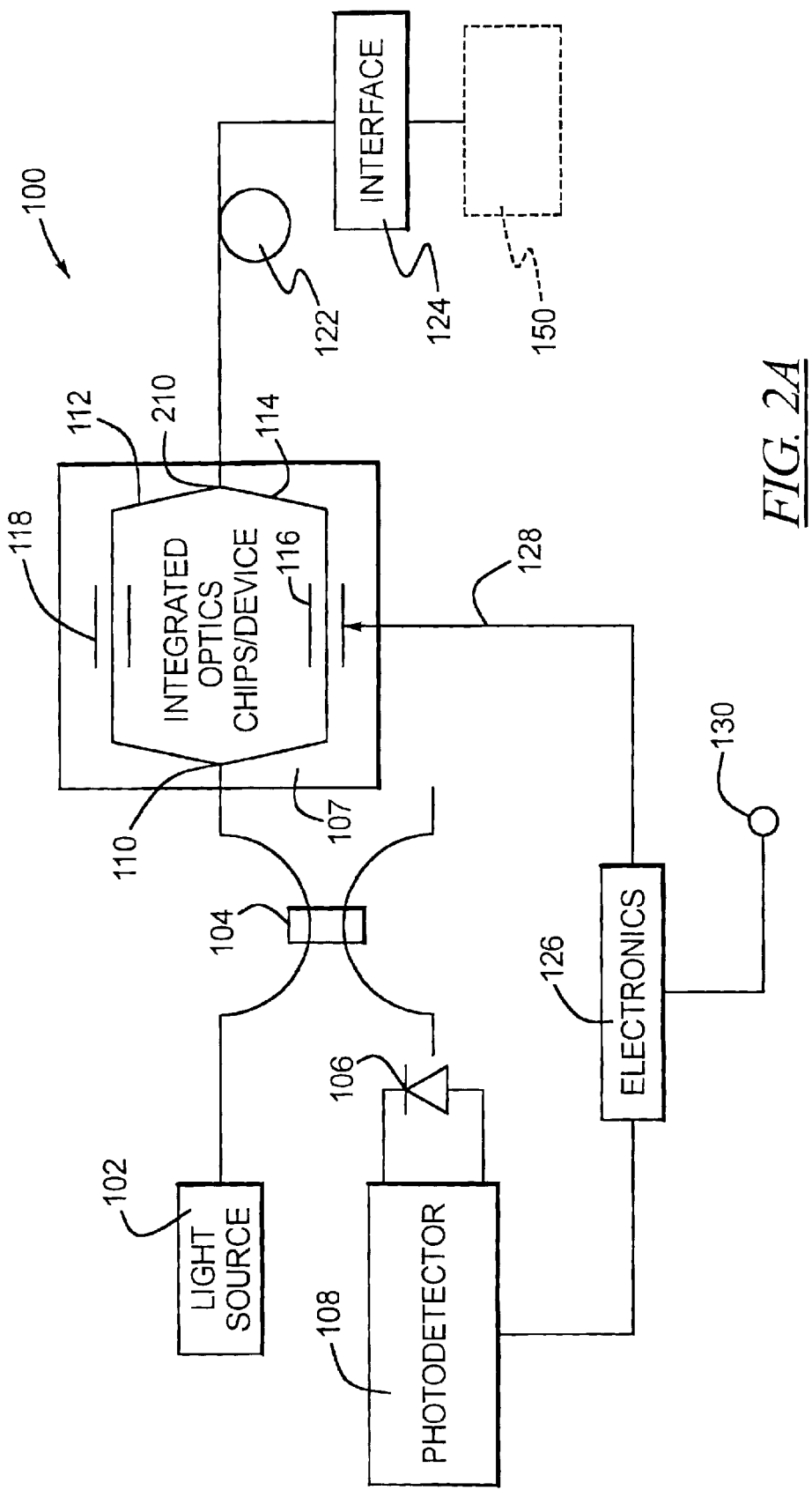
FIG. 2A is a block diagram of a second exemplary embodiment of a sensor according to the present invention.
Figure 2B:
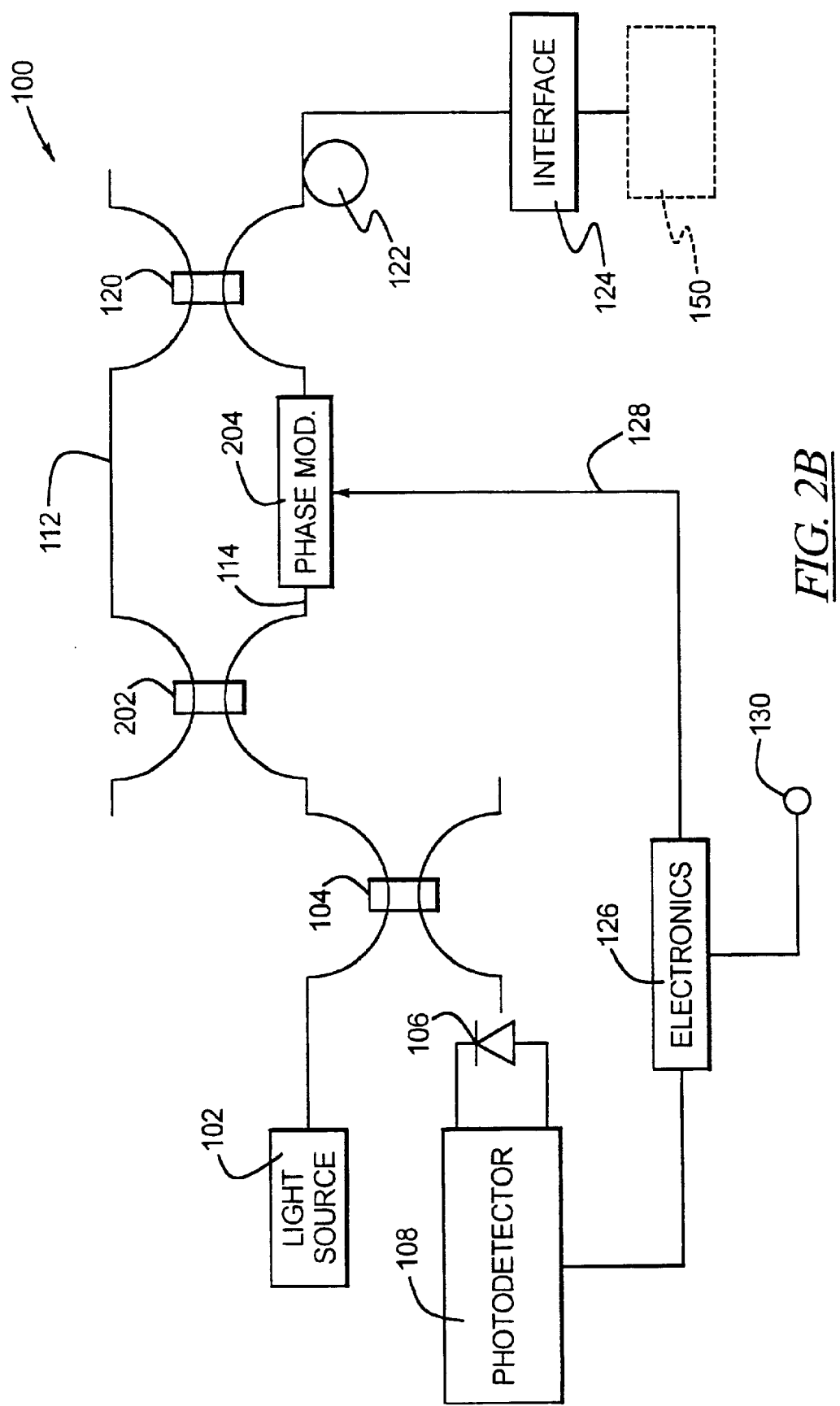
FIG. 2B is a block diagram of a third exemplary embodiment of a sensor according to the present invention.
Figure 2C:
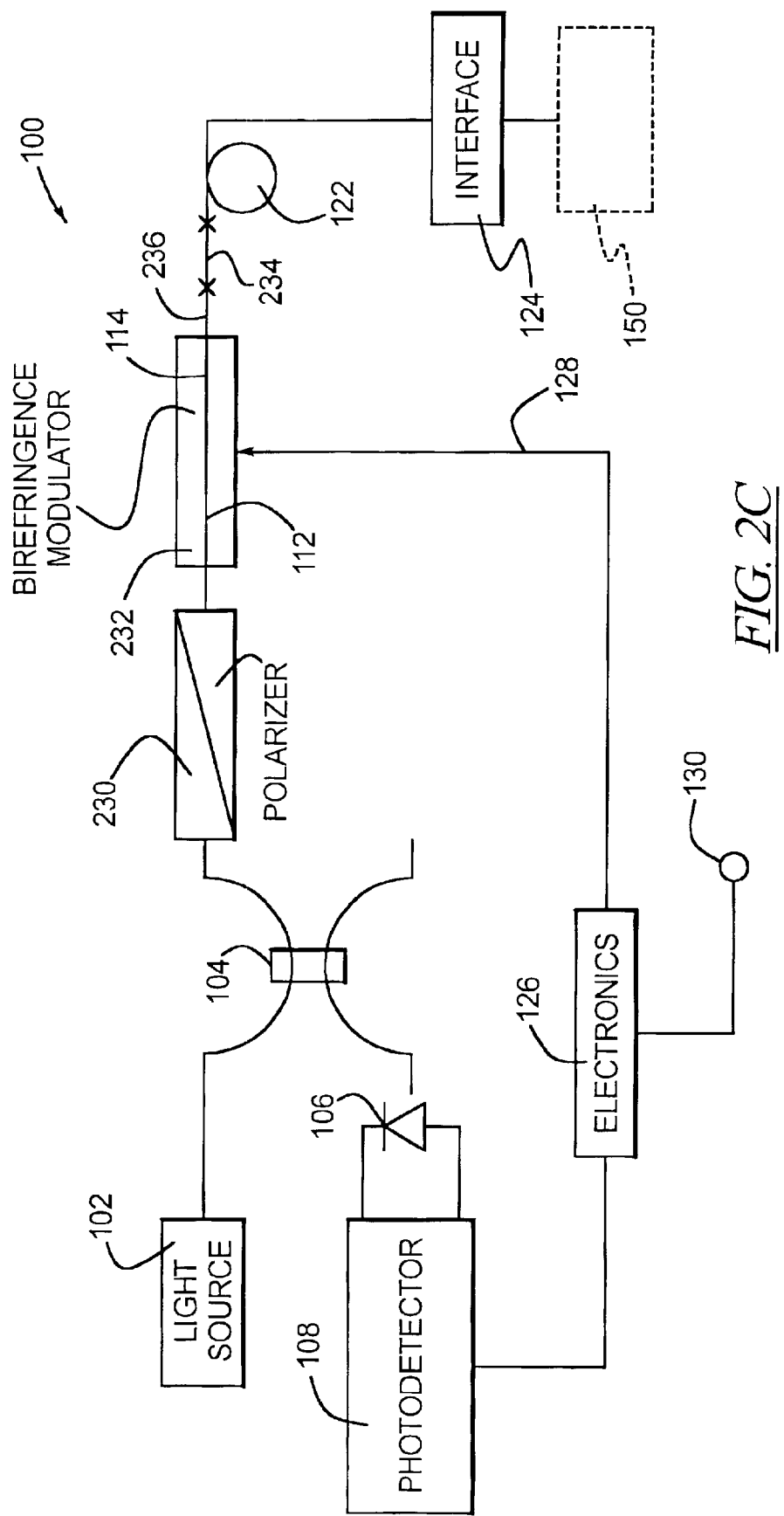
FIG. 2C is a block diagram of a fourth exemplary embodiment of a sensor using birefringence modulation in polarization modes according to the present invention.

FIGS. 2A, 2B and 2C are schematics of exemplary alternate embodiments of sensors.

With reference to FIG. 2A, various embodiments of sensor 100 may eliminate coupler 120 and replace IOC 107 shown in FIG. 1 with a modified IOC 107 as shown in FIG. 2. With reference to FIG. 2B, IOC 107 is eliminated altogether and replaced with a coupler 202 and a phase modulator 204. Phase modulator 204 may be a piezoelectric modulator or any other type of phase-modifying device. Coupler 202 is any conventional coupler such as described above in conjunction with couplers 104 and 120. Moreover, it is not necessary to modulate the phase of light passing through path 112 to produce an appropriate output signal 130. With reference to FIG. 2C, IOC 107 is replaced with a polarizer 230, a birefringence modulator 232, and a depolarizer 234. In such embodiments, the polarization of light passing through modulator 232 is modulated by signal 128, using the techniques described herein, to produce a transverse magnetic (TM) mode and a transverse electric (TE) mode having different (e.g. orthogonal) polarizations. Interference between the TM and TE signals can then be detected at photodiode 106, as described above.

Polarizer 230 is nominally shown in FIG. 2C as a 45-degree polarizer, although any angle of polarization except zero or ninety degrees could be used. Sensor 100 may also include a portion 236 of polarization-maintaining fiber to transmit the two modes from modulator 232 to depolarizer 234.

Hence, an interference pattern may be produced at detector 106 even though sensor 100 includes but a single physical path 112, 114. The terms "splitter" or "splitting means" as used herein, may refer not only to a fiber splitter but also to any structure that creates two or more optical paths. Other embodiments of sensor 100 modulate signal amplitude, frequency or other characteristics of light passing through the sensor to produce distinct but interfering light paths or modes. Any of the components described herein as part of sensor 100 may be replaced by equivalent bulk optics components such as modulators, couplers, and the like.

Figure 3:
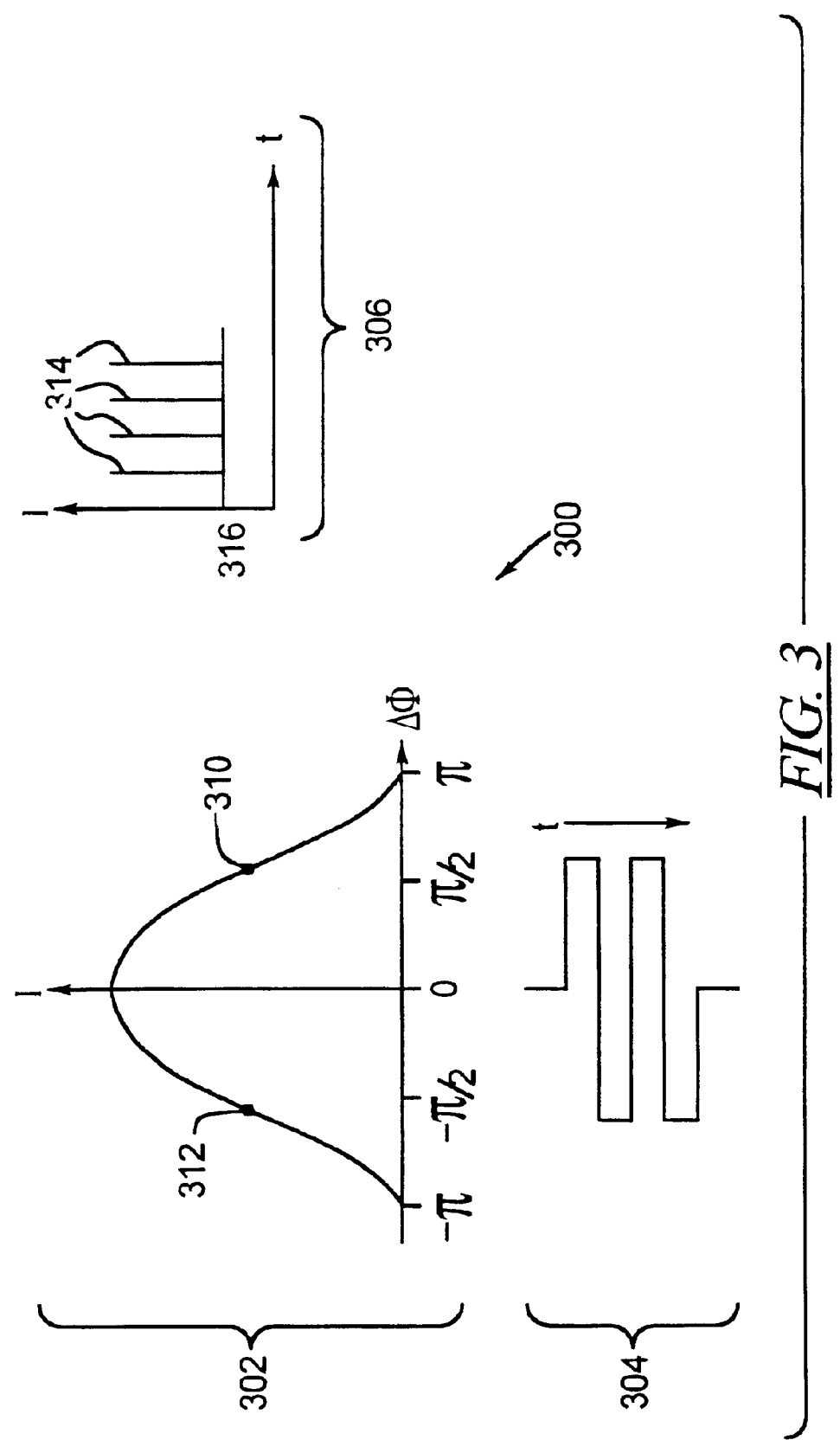
FIG. 3 is a plot of various performance characteristics for an exemplary sensor according to the present invention.

With reference now to FIG. 3, an exemplary output characteristic 300 for a sensor operating at a proper frequency is shown. With reference now to FIG. 3, an interferogram 302 suitably plots the intensity of light impinging on photodetector 108 versus the phase shift observed between the two light beams propagating in sensor 100. The intensity of the light is suitably maximized when the light beams are in phase, such as corresponding to zero phase shift or any integer multiple of +/−2π phase shift. Similarly, the intensity of the light is minimized when the light beams are out of phase, in correspondence to a π phase shift, or any odd integer multiple of +/−π. When the sensor operates near a maximum or minimum point on interferogram 302, however, changes in phase (Δφ) produce only small changes in the intensity of light (I).

Moreover, it may be difficult to detect the magnitude of changes in phase from the intensity of light at such operating points, since the curve decreases in both directions departing from the maximum points and increases in both directions departing the minimum points. Various embodiments may therefore bias the gyro to a more sensitive operating point, such as point 310 or point 312 on interferogram 302, which correspond to phase shifts of π/2 and −π/2, respectively. Of course any odd integer multiple of +/−2π would produce a similar result.

This modulation may be produced with modulation 304, which corresponds to modulation signal 128 in FIG. 1 and FIG. 2, as described more fully below in connection with FIG. 4. FIG. 3 shows bias modulation 304 is an alternating bias signal that produces phase biases of +/−π/2 radians between the two beams propagating in sensor 100. It will be appreciated that any modulation 304 could be provided according to the particular characteristics and needs of the particular embodiment.

As the two beams are biased in accordance with modulation 304, then the output intensity of light incident upon detector 108 over time may be as shown in plot 306 in FIG. 3. Plot 306 shows that the output intensity of the light (I) is relatively constant at the level 316 corresponding to points 310 and 312 on interferogram 302, with momentary spikes 314 resulting from the transition in operating points from point 310 to point 312, and vice versa. Level 316 may also include a component from the two paths, paths 112 and 114, that do not interfere. Spikes 314 may be filtered, ignored, or otherwise processed by an electronic system 126 shown in FIG. 1, such that the relatively constant output level 316 may be observed.

FIG. 4 is a plot of an exemplary modulation technique applied at a proper frequency that may be used to generate modulation 304. With reference to FIGS. 1 and 4, bias modulation signal 128 is generated by electronic system 126 and provided to modulator 116 to modulate light traveling on waveguide 114. Each beam of light involved in creating interferogram 302, shown in FIG. 3, passes through waveguide 114, but at a different time (e.g. a first beam passes through waveguide 114 on the way to the sensed device, the second beam passes through waveguide 114 after being reflected by the sensed device). The modulations applied to the two beams, then, are suitably identical but shifted in time according to a delay constant (τ) of the sensor, which is related to the path length of the light beam.

With reference to FIG. 4, an exemplary modulation signal 128 is a sawtooth waveform having an amplitude tailored to modulator 116, such that the desired phase shift is produced, and having a frequency that is tuned to the proper frequency of sensor 100. Any technique for sensing proper frequency could be used with the sensors disclosed herein. Similarly, modulation signal 128 may be any digital or analog serrodyne, triangle, ramp, dual ramp, pulse, step or other waveform, as appropriate, or may incorporate characteristics of multiple waveforms.

As shown in FIG. 4, the modulations applied to the two beams counter-propagating in sensor 100 are identical but shifted in time by delay constant τ. The difference between these two signals is shown as signal Δφ 304, which corresponds to signal 304 in FIG. 3. Any modulation signal 128 that produces a desired phase modulation 304 may be used in various embodiments of sensor 100.

FIG. 5 is a plot of an exemplary modulation technique that is not applied at a proper frequency. A modulation signal 128 is applied to modulator 116, but the frequency of signal 128 is not tuned to a proper frequency related to the delay constant τ. Hence, the difference in phase (Δφ) 304 between beam 1 and beam 2 does not produce a balanced phase modulation signal like that described above. Rather, the difference 304 between the two beams may be characterized by relatively long periods of bias at level 502 interspersed by relatively short periods corresponding to time τ of bias 504 in an opposite direction and with much larger magnitude than level 502.

Figure 6:
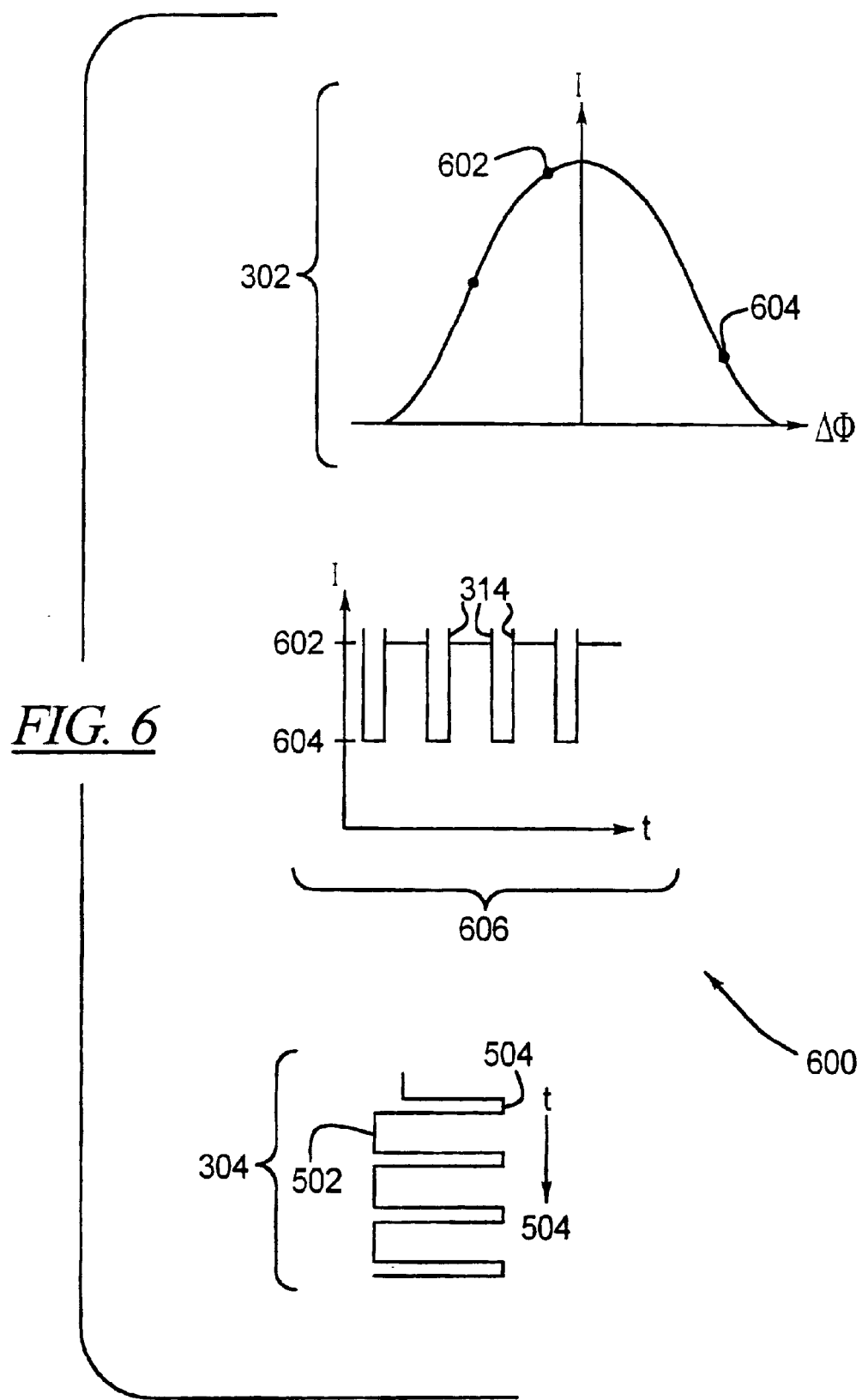
FIG. 6 is a plot of various performance characteristics for an exemplary sensor that is not operating at the proper frequency.

An exemplary output characteristic 600 corresponding to the modulation Δφ 304 shown in FIG. 5 is shown in FIG. 6.

In FIG. 6, modulation 304 applied to interferogram 302 produces an output characteristic 606 at a photodetector 108. As shown in FIG. 6, points 504 on modulation 304 correspond to point 604 on interferogram 302 and output plot 606. Points 502 on modulation 304 correspond to points 602 on interferogram 302 at output plot 606. Hence, the light intensity observed at photodetector 108 suitably alternates between levels 602 and 604.

By comparing and contrasting plot 606 with plot 306 in FIG. 3, it will be appreciated that the light intensity incident upon photodetector 108 is dependent upon the frequency of the modulation signal, and that the proper frequency of the modulation signal, such as the frequency that produces a relatively constant output at photodetector 108, is dependent upon the time that light takes to pass through sensor 100. It therefore follows that the proper modulation frequency is related to the length of the light path. Consequently, the output 130 may be determined from the modulation that results in relatively constant output at detector 108, or in any other suitable desired effect upon the detector output. Stated another way, the length of an optical path can be readily determined as a function of the proper modulation frequency that produces a relatively constant output at detector 108.

Adjustments to modulation signal 128 may be performed by a microcontroller, microprocessor, digital signal processor or other controller associated with electronic system 126.

The detector output is sampled at a frequency at least as high as the frequency of modulation signal 128 such that changes in the detector output may be identified.

As the frequency of modulation signal 128 approaches the proper frequency for the length of the optical path, changes in the detector output are suitably reduced. When an exemplary sensor 100 is modulated at a proper frequency, the output characteristic appears as in FIG. 3. When the sensor is modulated at a frequency that is not proper for the particular path length, output characteristics observed at detector 108 may be skewed, as shown in FIG. 6. By attempting to maintain the detector output at a desired level, the length of the optical path traveled by the light in sensor 100 may be readily calculated from said proper frequency using a lookup table, mathematical formula, or other technique. This concept may be used to create various sensor devices such as LIDARS, break or fault testers, fiber length testers, range finders, or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A sensor for determining a length of an optical path, the sensor comprising:
    a light source configured to direct light along said optical path;
    at least one modulator optically coupled to said light source, said at least one modulator configured to modulate at least a portion of said light as a function of a modulation signal;
    a detector optically coupled to said at least one modulator configured to produce a detector output based upon a sensed intensity of said light at the end of said optical path; and
    an electronics system configured to receive said detector output, and to provide an output indicative of the optical path length, wherein the modulation signal is a function of the detector output.

2. The sensor of claim 1, wherein said modulation signal is a function of said detector output to produce a desired effect upon said light, whereby said length of said optical path is determined by said electronic system as a function of said modulation signal that produces said desired effect.

3. The sensor of claim 1, further comprising an optical splitter optically coupled between said light source and said at least one modulator, whereby light passing through said optical splitter is split into a first path and a second path.

4. The sensor of claim 3, wherein said detector output is indicative of the difference in phase in the light traveling along said first path and said second path.

5. The sensor of claim 1, wherein said modulation signal is generated at a frequency that is a function of the length of said optical path.

6. The sensor of claim 5, wherein said electronic system adjusts a frequency of said modulation signal in response to changes in said detector output to maintain said modulation signal at a frequency related to said optical path.

7. A method of determining a length of an optical path, the method comprising:
    generating a light along the optical path;
    splitting said light into a first beam and a second beam;
    modulating at least one of said first beam and said second beam in response to a modulation signal to induce a difference between said first beam and said second beam;
    re-combining said first beam and said second beam to generate a recombined signal;
    detecting an output intensity of said recombined signal at a detector;
    adjusting said modulation signal as a function of said output intensity; and
    computing said length of said optical path as a function of said modulation signal.

8. The method of claim 7, wherein said adjusting said modulation signal comprises maintaining said modulation signal at a frequency such that said output intensity remains substantially constant.

9. The method of claim 7, wherein said difference between said first beam and said second beam is a phase difference.

10. The method of claim 7, wherein said modulation signal is a ramp waveform having a frequency.

11. The method of claim 7, further comprising applying said modulation signal to said second beam after a delay has elapsed since application of said modulation signal to said first beam, such that said delay is based upon said length of said optical path.

12. The method of claim 11, wherein said adjusting of said modulation signal comprises sampling said output intensity to determine differences in said output intensity over time.

13. The method of claim 12, wherein said adjusting of said modulation signal further comprises altering the frequency of said modulation signal to reduce said differences in said output intensity over time.

14. The method of claim 13, wherein said adjusting step comprises determining a proper frequency for said modulation signal such that differences in said output intensity are minimized over time.

15. The method of claim 14, wherein said computing of said length comprises determining said length of said optical path from said proper frequency.

16. A system for determining the length of an optical fiber under test, the system comprising:
    a low coherence white light source configured to send light along an optical path defined by an optical fiber;
    a phase modulator optically coupled to the light source for modulating at least a portion of the light in a first path relative to a second path;
    a detector optically coupled to the optical path for producing a detector output based upon a length of the optical path; and
    a processor for receiving the detector output, and for producing an output based upon the length of the optical path, wherein the light source has a coherence length shorter than a difference in path length between the first and the second paths, and wherein the modulator operates responsive to a modulation signal that is a function of the detector output.

17. The system of claim 16, further comprising a coupler between the white light source and the modulator.

18. The system of claim 17, wherein said coupler is a 2×2 coupler.

19. The system of claim 16, further comprising a delay fiber optically coupled to said fiber.

20. The system of claim 16, further comprising a connector for probing optical transducers at the end of a section of optical fiber.

21. The system of claim 16, further comprising telescope optics for transmitting and collecting light from objects or from the air.

22. The system of claim 16, wherein the processor receives the detector output such that the length of the optical path traveled by said light is determined.

23. The system of claim 16, wherein the processor receives the detector output such that a break fault in the fiber under test is determined.

* * * * *